(12) United States Patent
Gosling

(10) Patent No.: US 6,551,507 B2
(45) Date of Patent: Apr. 22, 2003

(54) RELEASABLE END CAP FOR LIQUID REMOVAL APPARATUS

(75) Inventor: Stephen Gosling, Alton (GB)

(73) Assignee: Thames Water Utilities Limited, Reading (GB)

(*) Notice: Subject to any disclaimer, the term of this patent is extended or adjusted under 35 U.S.C. 154(b) by 0 days.

(21) Appl. No.: 09/832,442

(22) Filed: Apr. 11, 2001

(65) Prior Publication Data
US 2001/0054582 A1 Dec. 27, 2001

(30) Foreign Application Priority Data
Apr. 11, 2000 (GB) ............................................... 0008933

(51) Int. Cl.[7] .......................... B01D 29/31; B01D 35/28
(52) U.S. Cl. ...................... 210/232; 210/416.1; 210/460
(58) Field of Search .................................. 210/767, 232, 210/238, 416.1–416.5, 459, 460; 137/140

(56) References Cited

U.S. PATENT DOCUMENTS

| 243,446 A | * | 6/1881 | Haggerty |
| 1,230,971 A | * | 6/1917 | Wilson |
| 1,394,011 A | * | 10/1921 | Hills |
| 1,690,958 A | * | 11/1928 | Vallez |
| 2,725,144 A | * | 11/1955 | Smith et al. |
| 2,886,181 A | * | 5/1959 | Wiedorn |
| 3,397,793 A | * | 8/1968 | MacDonnell |
| 3,487,935 A | * | 1/1970 | Lovitz |
| 3,762,562 A | * | 10/1973 | Okuniewski et al. |
| 4,756,826 A | * | 7/1988 | Horvath |
| 4,973,403 A | * | 11/1990 | Kozey |
| 5,269,338 A | * | 12/1993 | Figas |
| 6,051,132 A | * | 4/2000 | Flores |

FOREIGN PATENT DOCUMENTS

EP 0213930 * 3/1987

* cited by examiner

Primary Examiner—Fred Prince
(74) Attorney, Agent, or Firm—Ostrager Chong & Flaherty LLP

(57) ABSTRACT

The invention relates to a liquid removal apparatus comprising a body for disposal in a mixture of particulate material and a liquid, comprising an inlet adapted to allow entry of substantially only a liquid, and conduit means in liquid communication with the inlet for entrainment of liquid away from the inlet. The inlet comprises a releasable end cap at an end thereof remote from the conduit means that is releasable by means of the conduit means.

20 Claims, 4 Drawing Sheets

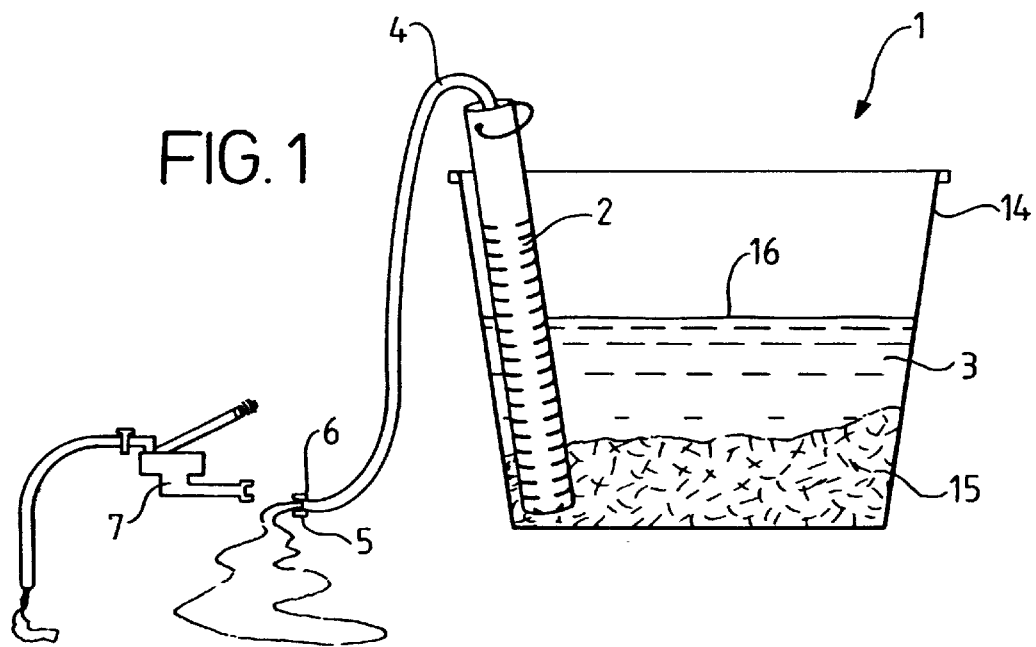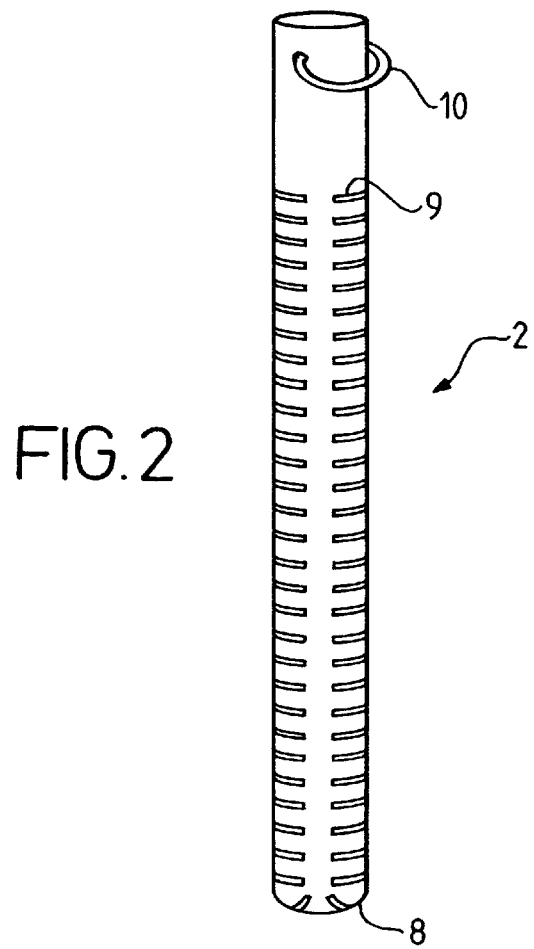

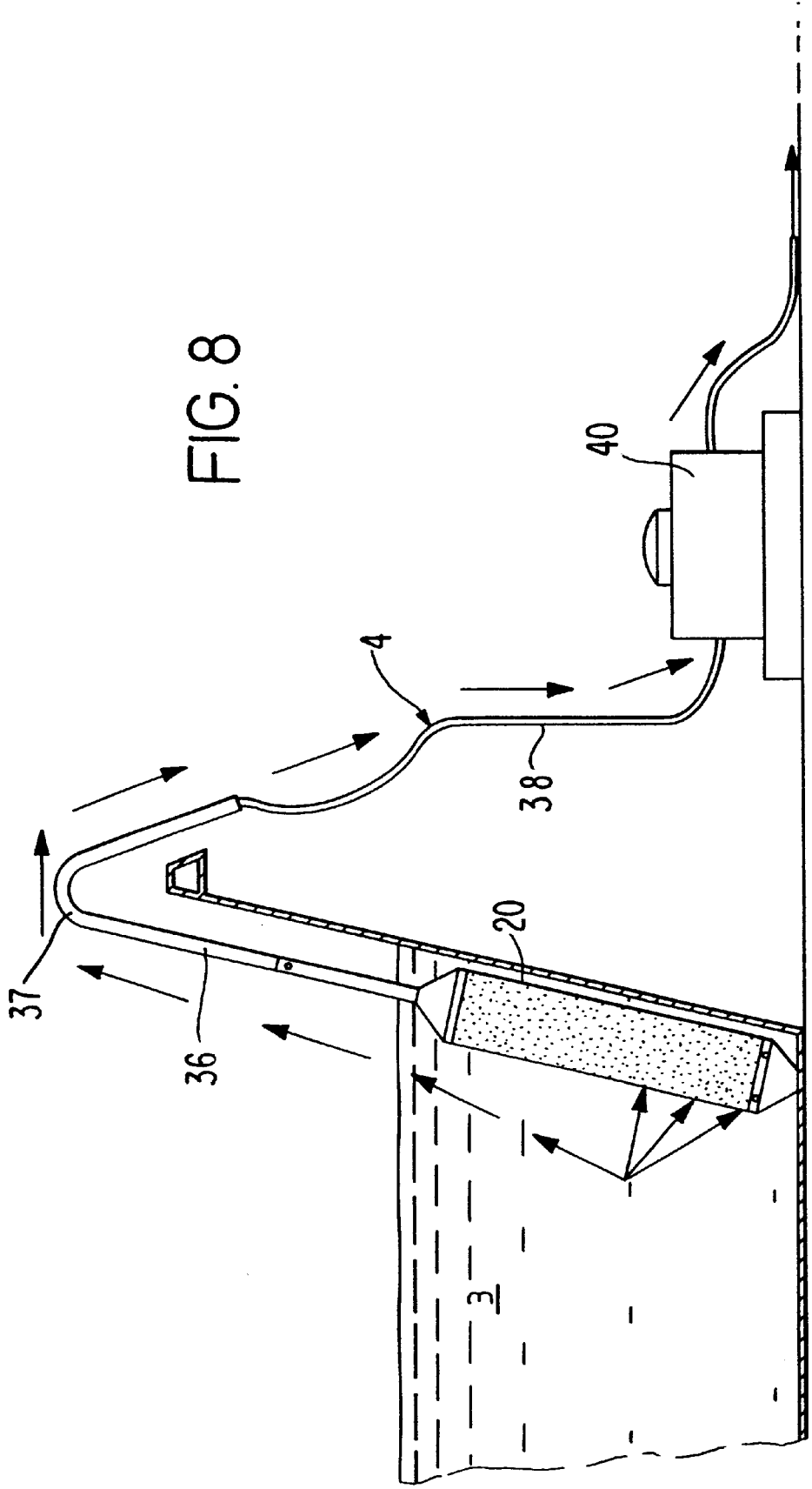

RELEASABLE END CAP FOR LIQUID REMOVAL APPARATUS

This application claims priority to United Kingdom Patent Application No. 0008933.4, filed Apr. 11, 2000.

FIELD OF INVENTION

This invention relates to liquid removal apparatus and a method of removing liquid and more particularly relates to liquid removal apparatus for removing liquid from containers containing a mixture of particulate material such as grit or screenings and a liquid such as water.

BACKGROUND OF INVENTION

When particulate material such as grit or screenings is excavated it often contains a relatively large amount of water mixed in with the particles. This presents a problem in disposal of the material because it occupies space in removal containers such as skips. It also wastes water. Furthermore, where the material is to be deposited in land-fill sites it increases the amount of land fill tax payable for a given quantity of material, which is assessed by weight of a load.

It is an object of the present invention to seek to mitigate problems such as these.

SUMMARY OF INVENTION

According to the invention there is provided liquid removal apparatus comprising a body for disposal in a mixture of particulate material and a liquid, the body comprising an inlet device adapted to allow entry of substantially only a liquid, and conduit means in liquid communication with the inlet for entrainment of liquid away from the inlet.

It is preferred that the inlet comprises a substantially cylindrical elongate tube, including a plurality of perforations. The elongate tube may comprise entirely or partly a mesh, and may have a releasable end cap at an end of the tube remote from the conduit means. For convenience in operation, and also in some cases, for health and safety considerations, it is preferred that the end cap is releasable from the body by means of the conduit. For example, the conduit may be slidable within the body to contact and release the end cap. The conduit may comprise an elongate pipe, which is flexible over some or all of its length, and may include a quick release coupling at at least one of its ends.

The inlet may include a handle to enable it to be easily manipulated.

The apparatus may also include mounting means to enable it to be removably attached to the side of a container. The mounting means preferably comprises a clamp adapted to clamp to the inlet and a hook or hooks for attachment to the side of a container.

According to a second aspect of the invention there is provided a method for removal of liquid from a mixture of particulate material and liquid contained in a container comprising the use of apparatus as hereinabove defined.

BRIEF DESCRIPTION OF THE DRAWINGS

The invention will further be described by way of example with reference to the accompanying drawings in which:

FIG. 1 is a schematic cut-away side view of apparatus according to the invention;

FIG. 2 is an enlarged view of a part of the apparatus illustrated in FIG. 1;

FIG. 8 is a schematic view of the apparatus of FIGS. 6 and 7 in use.

DESCRIPTION OF PREFERRED EMBODIMENTS

Figure 3:
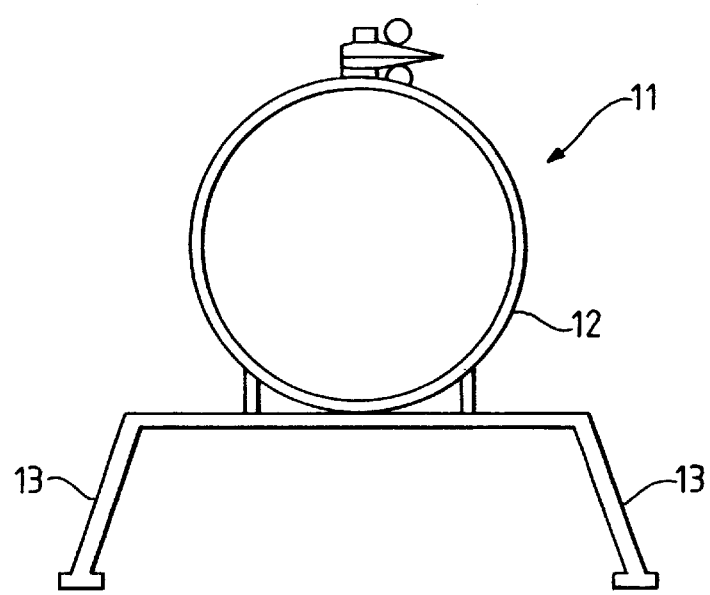
FIG. 3 is a plan view of a mounting means for use with the invention.

Referring to the drawings there is illustrated liquid removal apparatus comprising a body 1 for disposal in a mixture of particulate material and a liquid comprising an inlet 2 adapted to allow entry of substantially only a liquid 3, and conduit means 4 in liquid communication with the inlet 2 for entrainment of liquid 3 away from the inlet 2.

Referring to FIG. 2, the inlet 2 comprises a substantially cylindrical elongate tube which is blind at one end 8 and open at The other. The wall of the tube includes a plurality of through slots 9 which in the embodiment are arranged from about ⅕ of the way down the tube 2, and around the blind end 8. The slots 9 are dimensioned so as to avoid entry of grit and sand. As will be appreciated, other shapes of aperture instead of slots may be used. At the open end of he tube a handle 10 is positioned.

The conduit 4 may comprise a plastics material and can be for example a conventional garden hose or similar. It may be attached to the inlet 2 by suitable attachment means such as are commercially available, but it may also merely be passed into the open end of the inlet 2 and down to the closed end 8. At its end 6 remote from the inlet 2 the conduit is provided with a quick release connector 5 such as is well known in the art.

Figure 4:
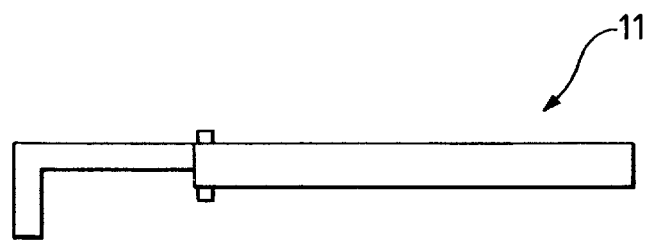
FIG. 4 is a side view of the part shown in FIG. 3.
Figure 5:
FIG. 5 is a side view of an alternative mounting means for use with the invention.

Referring to FIGS. 3 and 4 the inlet 2 is preferably provided with mounting means 11 and includes a releasable jubilee clip-type attachment 12 and two hooks 13. The hooks may be angled relative to the clamp (FIG. 5).

In use, the inlet 2 is first placed into a container 14 which contains a mixture of particulate material such as grit or screenings 15. The grit or screenings are put into the container 14 along with the inevitable quantity of water excavated therewith. When the container 14 is sufficiently full such that the water level 16 has risen to near the top of the container 14, a device such as a hand pump 7 is attached to a quick release connector 5 to apply suction to the conduit 4. This initiates siphoning. The hand pump 7 can then be removed from the quick-release connector 5 and the water will be removed. This obviates the need for pumping apparatus at sites where power sources may not be to hand.

Figure 6:
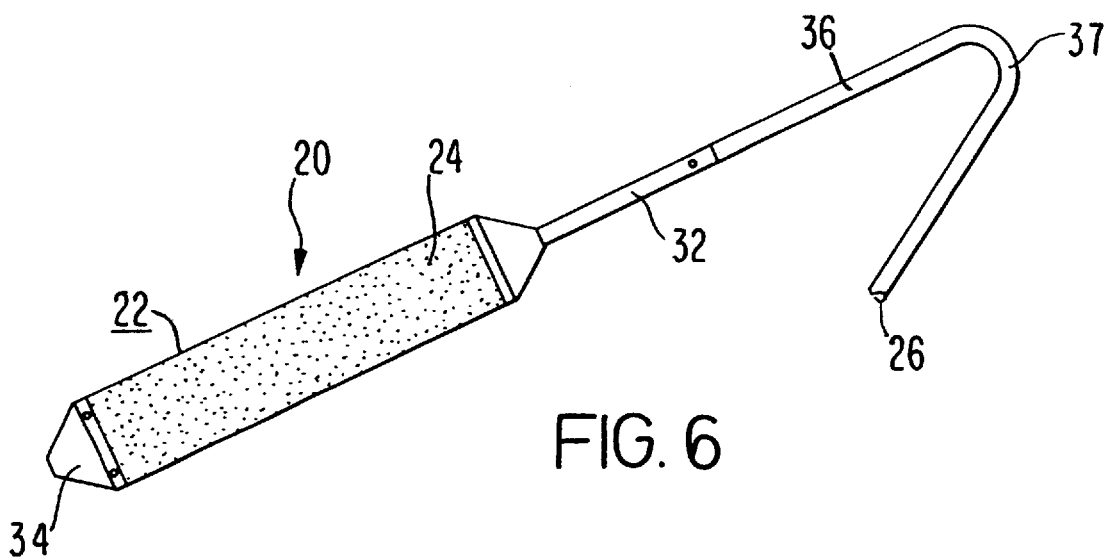
FIG. 6 is a schematic side view of a second embodiment of apparatus according to the invention.
Figure 7:
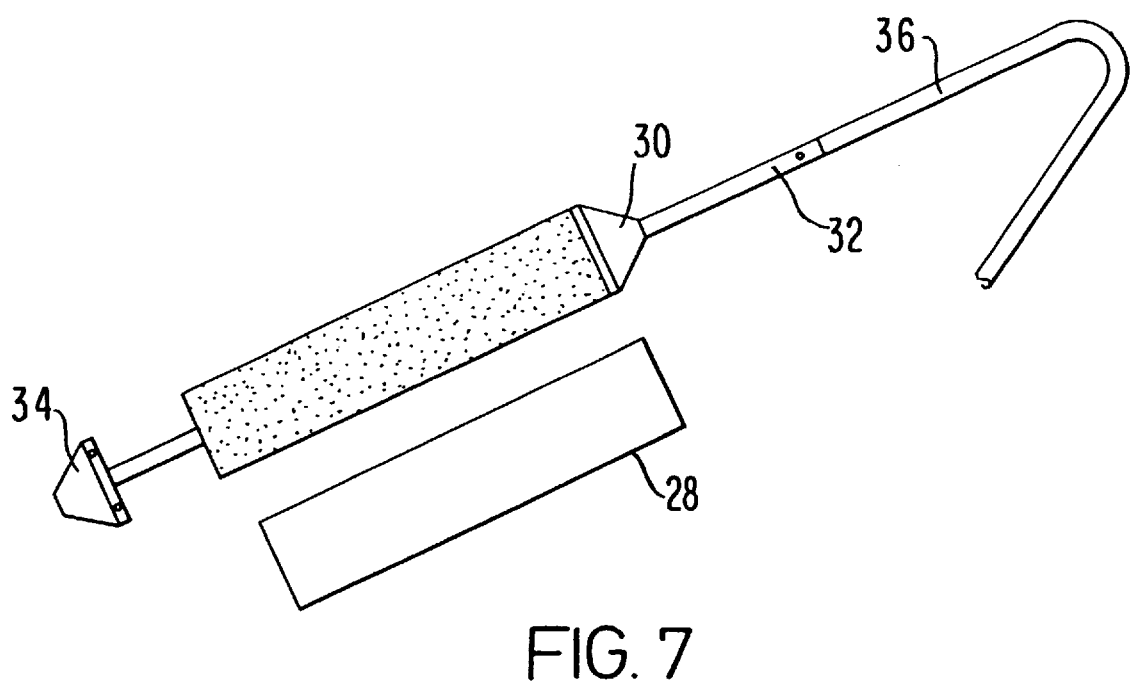
FIG. 7 is a schematic, exploded view of the apparatus of FIG. 6.

Referring to FIGS. 6 and 7, there is illustrated a second embodiment of apparatus according to the invention, comprising a body 20 for disposal in a mixture of particulate material and a liquid, comprising an inlet 22 adapted to allow entry of substantially only a liquid, and a conduit means 24 in liquid communication with the inlet 22 for entrainment of the liquid away from the inlet 22, the conduit means 24 being provided at its end 26 remote from the inlet 22 with a device to provide suction to the conduit 24.

In this embodiment of the invention the body 20 comprises a substantially cyclindrical elongate tube, but the tube is formed from a multi-perforated material, such as a metal mesh. Inside the mesh a correspondingly shaped and sized filter element 28 is placed, such as a micron filter. The grade and type of filter used will be determined by the nature of the particulate material. The filter element 28 is sized so that in position in the body, it forms a complete barrier so that water cannot pass into the interior of the tube without passing through the filter element 28.

At its upper, in use, end the body includes a frusto-conical connecting part 30 made from a metal or plastics material and dimensioned to fit into the end of the body. The part 30 has a substantially centrally located aperture, to which is attached a substantially rigid elongate shaft 32. The shaft 32 is hollow and accommodates the conduit means 24 therein which passes through the aperture into the body 20 and can be moved therein as by sliding, to terminate near a removable end cap 34, which in this embodiment is conical and attaches to the mesh by a push fit. Thus, the end cap 34 can be removed from the body 20 by sliding the conduit 24 into the body to contact and dislodge it. As an alternative, the end cap 34 can be attached to the end of the conduit 24, for example by a screw thread, so that when it is dislodged it remains attached to the conduit. This provides the advantage that the end cap does not need to be handled by an operator which could be important from a health and safety perspective as the material or liquid may contain harmful substances. The conduit 24 is in liquid communication with an extension piece 36 which has a bend 37 although the conduit 24 and extension 36 could be formed as one piece. End cap 34 is conical in shape to help with insertion of the body 20 into a prefilled container of particulate material.

In use, the apparatus operates in a similar way to that described with reference to the first embodiment. Referring to FIG. 8, the body 20 is placed into the container (in this case a skip) containing water and particulate material with the bend 37 in the extension piece 36 helping to retain it in position. A tube 38 running from the extension piece 36 passes to a foot pump 40 which can be used either to initiate siphoning or to manually pump liquid from the skip.

It is preferable to use a pump which removes liquid relatively slowly. This is because a slow rate of liquid flow tends to prevent particles of material being sucked onto the slots or perforations thereby impeding flow of liquid.

What is claimed is:

1. Liquid removal apparatus comprising a body for disposal in a mixture of particulate material and a liquid, the body comprising: (a) an inlet device adapted to allow entry of substantially only the liquid, the inlet device comprising a substantially cylindrical elongate tube including a plurality of perforations; (b) conduit means in liquid communication with the inlet device for entrainment of the liquid away from the inlet device; and (c) a releasable end cap at an end of the tube remote from the conduit means, the end cap being releasable by means of the conduit means.

2. Apparatus according to claim 1, the conduit means being slideable within the body to release the end cap.

3. Apparatus according to claim 1, the end cap being attached to the conduit means.

4. Apparatus according to claim 1, the conduit means being partly or entirely flexible.

5. Apparatus according to claim 1, including mounting means for temporarily attaching the body to a side of a container.

6. Apparatus according to claim 5, the mounting means including a clamp adapted to clamp to the body and a side hook or hooks for attachment to the side of the container.

7. Apparatus according to claim 1, the conduit means including a quick release coupling at an end remote from the body.

8. Apparatus according to claim 1, the apparatus including pump means attached to the end of the conduit means remote from the body.

9. Apparatus according to claim 1, wherein the elongate tube comprises entirely or partly a mesh.

10. Liquid removal apparatus comprising a body for disposal in a mixture of particulate material and a liquid, the body comprising: (a) an inlet device adapted to allow entry of substantially only the liquid; (b) conduit means in liquid communication with the inlet device for entrainment of the liquid away from the inlet device; and (c) a releasable end cap at an end of the body remote from the conduit means, the end cap being releasable by means of the conduit means.

11. Apparatus according to claim 10, wherein the inlet device comprises a substantially cylindrical elongate tube including a plurality of perforations.

12. Apparatus according to claim 10, wherein the inlet device comprises a substantially cylindrical elongate tube comprising entirely or partly a mesh.

13. Apparatus according to claim 10, wherein the conduit means is slidably positioned in the body such that the conduit means can be used to release the end cap from the body.

14. Apparatus according to claim 10, wherein the end cap is attached to the conduit means.

15. Apparatus according to claim 10, wherein the conduit means is partly or entirely flexible.

16. Apparatus according to claim 10, further comprising mounting means for temporarily attaching the body to a side of a container.

17. Apparatus according to claim 16, wherein the mounting means comprises a clamp adapted to clamp to the body and a side hook or hooks for attachment to the side of the container.

18. Apparatus according to claim 10, further comprising a quick release coupling attached to an end of the conduit means remote from the body.

19. Apparatus according to claim 10, further comprising pump means attached to an end of the conduit means remote from the body.

20. Liquid removal apparatus comprising a body for disposal in a mixture of particulate material and a liquid, the body comprising: (a) an inlet device adapted to allow entry of substantially only the liquid, the inlet device comprising a substantially cylindrical elongate tube comprising entirely or partly a mesh; (b) conduit means in liquid communication with the inlet device for entrainment of the liquid away from the inlet device; and (c) a releasable end cap at an end of the tube remote from the conduit means, the end cap being releasable by means of the conduit means.

* * * * *